United States Patent
Pankaj et al.

(10) Patent No.: US 10,719,202 B2
(45) Date of Patent: Jul. 21, 2020

(54) SYSTEM FOR DYNAMICALLY RENDERING A GRAPHICAL USER INTERFACE

(71) Applicant: Bank of America Corporation, Charlotte, NC (US)

(72) Inventors: Chandan K. Pankaj, Robbinsville, NJ (US); Vijaykumar Goyal, Hightstown, NJ (US); Yacine Arbani, Doylestown, PA (US); Xiaofeng Wang, Princeton Junction, NJ (US); Santosh Mali, Ewing, NJ (US); Patrick Kevin Kane, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 30 days.

(21) Appl. No.: 15/962,122

(22) Filed: Apr. 25, 2018

(65) Prior Publication Data

US 2019/0332246 A1 Oct. 31, 2019

(51) Int. Cl.
*G06F 3/0484* (2013.01)
*G06F 21/31* (2013.01)
*G06F 3/0481* (2013.01)
*G06Q 40/06* (2012.01)

(52) U.S. Cl.
CPC ........ *G06F 3/0484* (2013.01); *G06F 3/04817* (2013.01); *G06F 21/31* (2013.01); *G06Q 40/06* (2013.01)

(58) Field of Classification Search
CPC ........ G06F 3/0484; G06F 21/31; G06Q 40/06
See application file for complete search history.

(56) References Cited

U.S. PATENT DOCUMENTS

| 5,689,708 | A | * | 11/1997 | Regnier | G06F 9/468 |
| | | | | | 709/229 |
| 5,761,442 | A | | 6/1998 | Barr et al. | |
| 6,317,728 | B1 | | 11/2001 | Kane | |
| 7,103,853 | B1 | * | 9/2006 | Patil | G06F 3/0481 |
| | | | | | 715/744 |

(Continued)

OTHER PUBLICATIONS

Ferraiolo et al., "Role-Based Access Controls," Oct. 13-16, 1992, 15th National Computer Security Conference, https://csrc.nist.gov/publications/detail/conference-paper/1992/10/13/role-based-access-controls.*

(Continued)

*Primary Examiner* — Ryan Barrett
(74) *Attorney, Agent, or Firm* — Michael A. Springs

(57) ABSTRACT

A system for dynamically rendering a graphical user interface is disclosed. The system is configured to receive a login information associated with a user. The system then identifies a persona associated with the user based on the received login information. The identified persona is associated with a set of action commands and each action command includes a condition and a content item identifier. The system proceeds to identify the action commands associated with the identified persona, evaluate the conditions associated with the identified set of action commands, and determine the conditions that are satisfied based on the evaluating. Next, the system identifies the content item identifiers associated with the satisfied conditions and retrieves the content items associated with the identified content item identifiers. Then, the system renders the retrieved content items in a graphical user interface.

14 Claims, 7 Drawing Sheets

(56) References Cited

U.S. PATENT DOCUMENTS

| | | | |
|---|---|---|---|
| 7,225,174 B2 | 5/2007 | Schreckengast et al. | |
| 8,166,396 B2 | 4/2012 | Farn | |
| 8,789,019 B2 | 7/2014 | Sahni et al. | |
| 2002/0128950 A1 | 9/2002 | Wu et al. | |
| 2003/0229522 A1* | 12/2003 | Thompson | G06Q 10/067 705/4 |
| 2008/0059395 A1 | 3/2008 | Flinn et al. | |
| 2010/0257196 A1 | 10/2010 | Waters et al. | |
| 2011/0016423 A1 | 1/2011 | Brubaker | |
| 2011/0265188 A1* | 10/2011 | Ramaswamy | G06F 21/604 726/28 |
| 2012/0060207 A1* | 3/2012 | Mardikar | G06F 21/33 726/4 |
| 2013/0081105 A1* | 3/2013 | Giambiagi | H04L 63/20 726/1 |
| 2013/0227638 A1* | 8/2013 | Giambiagi | G06F 21/00 726/1 |
| 2013/0282430 A1 | 10/2013 | Kannan et al. | |
| 2014/0157106 A1 | 6/2014 | Bertram et al. | |
| 2014/0304106 A1 | 10/2014 | Dahan | |
| 2015/0205471 A1 | 7/2015 | Abrams et al. | |
| 2016/0044132 A1* | 2/2016 | Croft | G06Q 10/06311 709/225 |
| 2019/0362087 A1* | 11/2019 | Ferrans | G06F 21/31 |

OTHER PUBLICATIONS

Carter, "RBAC vs ABAC Access Control Models," Jan. 19, 2017, https://blog.identityautomation.com/rbac-vs-abac-access-control-models-iam-explained.*

Internet Archive Wayback Machine, "RBAC vs ABAC Access Control Models," Aug. 20, 2017, https://web.archive.org/web/20170820153115/https:/blog.identityautomation.com/rbac-vs-abac-access-control-models-iam-explained.*

* cited by examiner

/⎯ 158

```
<persona>
        <persona ID>persona1</persona ID>
                <widget ID>widget 1</widget ID>
                        <CTA ID>CTA 1</CTA ID>
                                <condtion>condition 1</condition>
                                <content ID>content item ID 1</content ID>
                        <CTA ID>CTA 2</CTA ID>
                                <condition>condition 2</condition>
                                <content ID>content item ID 2</contentID>
                <widget ID>widget 2</widget ID>
                        <CTA ID>CTA 3</CTA ID>
                                <condition>condition 3</condition>
                                <content ID>content item ID 3</content ID>
                <widget ID>widget 3</widget ID>
                        <CTA ID>CTA 4</CTA ID>
                                <condition>condition 4</condition>
                                <content ID>content item ID 4</content ID>
                        <CTA ID>CTA 5</CTA ID>
                                <condition>condition 5</condition>
                                <content ID>content item ID 5</content ID>
                        <CTA ID>CTA 6</CTA ID>
                                <condition>condition 6</condition>
                                <content ID>content item ID 6</content ID>
</persona>
```

FIG. 2

SYSTEM FOR DYNAMICALLY RENDERING A GRAPHICAL USER INTERFACE

TECHNICAL FIELD

This disclosure relates generally to rendering a user interface, and more particularly to dynamically rendering a graphical user interface.

BACKGROUND

Often times, an internet content provider maintains a single web site for users, which provides universally identical web content to all users. The major problem with providing identical content to all users is that it ignores individual user's distinct taste and preference on the web content, thus tends to provide irrelevant content to the users. This significantly degrades user satisfaction, reduces conversion rate on the website, and decreases website metrics.

SUMMARY

Users may want to view and analyze their account information through a web site hosted by an institution. Many institutions maintain a single website for users and provide universally identical or similar web content to all users. For example, they may provide a graphical user interface configured with identical widgets and content items within an identical layout to all users. The problem with providing identical or similar content to all users is that it ignores individual users' distinct tastes and preferences on the web content, thus tends to provide irrelevant content to the users. This significantly degrades user satisfaction, reduces conversion rate on the website, and decrease website metrics. Furthermore, rendering the identical or similar content in a graphical user interface to all users may involve rendering irrelevant content for the users, thus resulting in a waste of computing resources (e.g., memory, bandwidth) used for rendering the irrelevant content. This creates a technical problem of inefficient and ineffective rendering of the graphical user interface.

To solve the above-described problems, the present application discloses a system that dynamically renders a graphical user interface and provides personalized content for users based on the users' account information (e.g., personal and financial information).

In some embodiments, the disclosed system receives a login information from a user. For example, the user may want to login to a web site to view his or her account portfolio statistics. The login information may include an identifier associated with the user. In response to receiving the login information, the system identifies a persona associated with the user based on the received login information. Then, the system identifies a set of action commands associated with the identified persona. In some embodiments, each action command is associated with a condition and a content item identifier. The system identifies the conditions associated with the identified action commands and evaluate the conditions. In some embodiments, the system evaluates the conditions based on a user account associated with the user to determine one or more of the conditions that are satisfied. After determining the one or more satisfied conditions, the system identifies one or more content item identifiers associated with the one or more satisfied conditions. Next, the system identifies one or more content items associated with the one or more content item identifiers and then renders them in a graphical user interface. In some embodiments, the system further identifies a set of widgets associated with the identified persona and renders the widgets in the graphical user interface along with the identified content items.

The above-described system is directed to dynamically rendering a graphical user interface. The disclosed system presents a specifically structured graphical user interface paired with a prescribed functionality directly related to the graphical user interface's structure. For example, the graphical user interface rendered using the disclosed system includes a set of widgets and a set of action commands specifically selected for a particular user. Note that the disclosed system is not directed to simply displaying information on the graphical user interface. Instead, the disclosed system is directed to dynamically personalizing and customizing the graphical user interface.

Also note that the disclosed system addresses a problem of efficiently rendering a graphical user interface that occurs in the context of computer graphics, which has no pre-electronic analog because graphical user interfaces are bonded to electronic devices and allow users to interact with the electronic devices. The disclosed system provides a personalized online experience for users based on their preferences, characteristics, past interactions, and other factors. It increases users' engagement with a web site, which helps the web site to retain visitors.

The disclosed system may further improve the performance of the underlying computer technology. For example, the system does not render a whole set of widgets and content items for each user. Instead, the system selects a subset of the widgets and content items for rendering for a particular user based on the evaluation of the conditions. This reduces the rendering time and loading time of the graphical user interface on the web site. This further facilitates conserve the computing resources (e.g., memory, bandwidth) used for rendering a whole set of widgets and content items for the graphical user interface. This may further reduce the bottleneck of the network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 2 illustrates an exemplary embodiment of a configuration file, according to the present disclosure;

DETAILED DESCRIPTION

Figure 1:
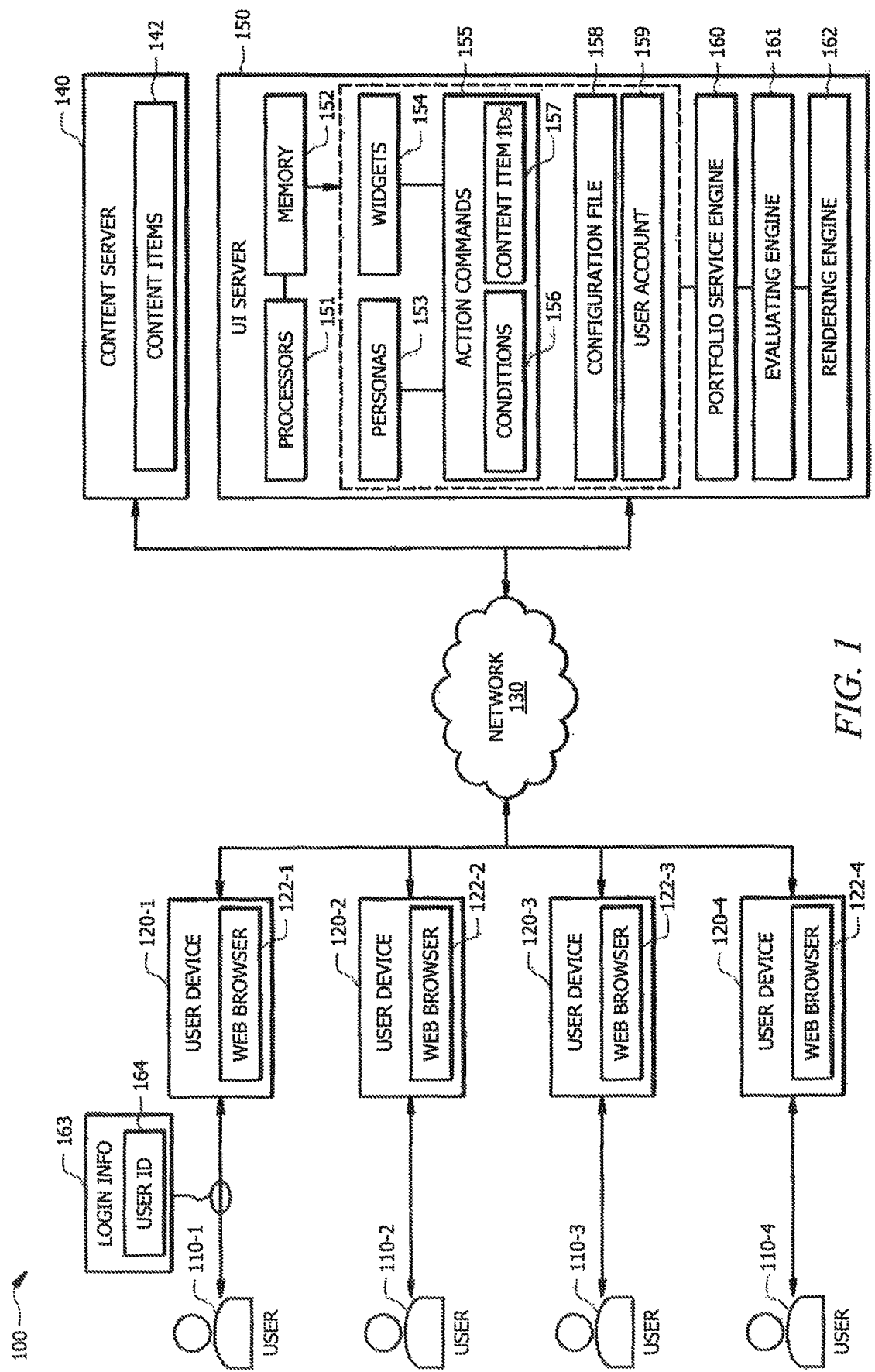
FIG. 1 illustrates an exemplary embodiment of a system for dynamically rendering a graphical user interface, according to the present disclosure.

FIG. 1 illustrates an exemplary embodiment of a system 100 for dynamically rendering a graphical user interface, according to the present disclosure. In some embodiments, as illustrated, system 100 includes one or more users 110, one or more user devices 120, a network 130, a content server 140, and a user interface (UI) server 150.

In general, system 100 is implemented to personalize and dynamically render a graphical user interface for users 110. In some embodiments, system 100 receives a login information 163 from a user 110 via network 130, identifies the user 100 based on the login information 163, determines content relevant to the identified user 100 using UI server 150, retrieves the relevant content from content server 140, and renders the retrieved relevant content for user 110.

Users 110 of system 100 comprise any suitable users including businesses or other commercial organizations, government agencies, and/or individuals. Users 100 may operate on one or more user devices 120 to access system 100.

User device 120 comprises any suitable device or machine configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers. In some embodiments, as illustrated, user device 120 includes a web browser 122 that provides support for the web protocols. For example, a user 110 may operate on a device 120 and uses a web browser 122 to navigate to an Internet web site to view his or her account portfolio statistics.

Web browser 122 comprises any suitable web browser configured for retrieving and presenting information resources on the network. For example, web browser 122 may include any suitable interfaces or applications that enable a user 110 to navigate the Internet, establish a connection to various Internet sites (also referred to herein as web sites), and view associated web pages. As used herein, the term "web site" refers to a location on the Internet defined by an Internet address or a uniform resource locator (URL). Also, the term "web site" should be broadly construed to cover a web site (a set of pages), a domain at a given web site or server, a trust domain associated with a server or set of servers, or the like. The term "web browser," as used herein, is not intended to refer to any specific browser (e.g., Internet Explorer®, Safari®, FireFox®, or the like), but should be broadly construed to refer to any client-side rendering engine that can access and display Internet-accessible resources.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Content server 140 comprises any suitable server configured to store and maintain web content for users 110. For example, content server 140 may comprise any suitable storage scheme including any software, hardware, firmware, and/or combination thereof capable of storing information. Exemplary content server 140 includes individual data storage devices (e.g., disks, solid-state drives), which may be part of individual storage engines and/or may be separate entities coupled to storage engines within. In some embodiments, content server 140 stores third-party databases, database management systems, a file system, and/or other entities that include or that manage data repositories. Content server 140 may be locally located or remotely located to other components of system 100. In some embodiments, as illustrated, content server 140 is configured to store content items 142. Content items 142 may include any suitable type of content, such as textual, visual, or aural content. For example, content items 42 may include text, images, sounds, videos, and animations related to account portfolio statistics (e.g., stocks, bonds, commodities, currencies, cash equivalents) of a user 110. Content items 142 may be used by UI server 150 for rendering a graphical user interface which will be sent to user device 120 and displayed in web browser 122.

UI server 150 comprises any suitable server configured to dynamically render a graphical user interface. For example, UI server 150 may retrieve a markup language code (e.g., HTML code, XML code) and one or more content items 142, parse the markup language code, analyze the visual elements in the markup language code, and render the markup language code with the one or more content items 142. In some embodiments, as illustrated, UI server 150 includes one or more processors 151, a memory 152, a portfolio service engine 160, an evaluating engine 161, and a rendering engine 162.

Processors 151 comprise one or more processors configured to fetch instructions from memory 152 and execute them to perform various processing functions for system 100. In certain embodiments, processors 151 communicatively couple to other components of system 100, such as memory 152, portfolio service engine 160, evaluating engine 161, rendering engine 162, or any other suitable component.

Memory 152 comprises any suitable memory configured to store, either permanently or temporarily, data, operational software, or other information for a processor. For example, memory 152 may store instructions to be executed by processors 151. In some embodiments, memory 152 is further configured to store one or more personas 153, corresponding widgets 154, and corresponding action commands 155. Memory 152 may be further configured to store a configuration file 158 indicating associations between personas 153, widgets 154, and action commands 155.

Personas 153 include fictional characters created to represent user types that might use a site, a brand, or a product in a similar way. Each persona 153 may be associated with a set of common characteristics shared by a group of users 110. Exemplary characteristics associated with personas 153 include populations, age range, number of active days per month, and assets under management (AUM) of a group of users 110 having a same persona 153, among others. As an example, a first user 110-1 may be associated with a first persona 153 represented by a first fictional character having a first set of characteristics. A second user 110-2 may be associated with a second persona 153 represented by a second fictional character having a second set of characteristics. A third user 110-3 may be associated with a third persona 153 represented by a third fictional character having a third set of characteristics. A fourth user 110-4 may be associated with a fourth persona 153 represented by a fourth fictional character having a fourth set of characteristics.

In some embodiments, personas 153 are synthesized by analyzing behavior patterns, goals, skills, attitudes, and the environment, and including a few fictional personal details of users 110 to make the personas 153 a realistic character. Personas 153 are useful in determining the goals, desires, behaviors, and limitations of users 110 to help to guide their decisions about a service, product or interaction space such as features, interactions, and visual design of a web site. Key benefits of associating users 110 with personas 153 includes: (1) it facilitates a specific, consistent understanding of various user groups because data about the user groups can be put in a proper context and can be understood and remembered in coherent stories; (2) it provides a human "face" so as to create empathy for the users 110 represented by the demographics; and (3) personas 153 may be used together with market segmentation, where the qualitative personas 153 are construed to be representative of specific segments. In some embodiments, each persona 153 is associated with a set of widgets 154 and a set of action commands 155.

Widgets 154 comprise any suitable widgets including applications, toolkits, graphical user interfaces, and/or libraries containing a set of graphical control elements. A widget 154 may be a stand-alone application that can be embedded into a web site or web page. In some embodiments, widgets 154 may be web widgets including applications with functionality that can be installed and executed within a web page. A widget 154 may display an information arrangement changeable by users 110, such as a window or a text box. Some exemplary widgets 154 include a portfolio performance widget, an asset allocation widget, a gain and loss widget, a projected income widget, a company holdings widget, and a holdings performance widget. In some embodiment, each persona 153 is associated with a set of widgets 154. For example, referring to FIG. 2, a persona 153 shown as "persona 1" is associated with three widgets 154, namely "widget 1," "widget 2," and "widget 3." Note that configuration file 158 of FIG. 2 is illustrated as having one persona 153 and three widgets 154 for illustrative purposes only. It may have any suitable number of personas 153 and each persona 153 may be associated with any suitable number and combination of widgets 154 that may be the same or different from each other.

As such, in some embodiments, each persona 153 is associated with a specific set of widgets 154. For example, a first persona 153 may be associated with a first set of widgets 154. A second persona 153 may be associated with a second set of widgets 154. A third persona 153 may be associated with a third set of widgets 154. A fourth persona 153 may be associated with a fourth set of widgets 154. In some embodiments, the widgets 154 included in different sets are mutually exclusive of each other. In other embodiments, the widgets 154 included in different sets are overlapping or at least partially overlapping.

In some embodiments, each widget 154 is associated with a set of action commands 155. Action commands 155 include commands or instructions to users 110 to provoke a response or action. Action commands 155 may be a banner, button, or any type of graphic or text on a web site meant to prompt a user 110 to respond, such as for example, by clicking it. For example, action commands 155 may be call to actions (CTAs) including words or phrases taking the form of a button or hyperlink that encourage users 100 to take an action. Some exemplary action commands 155 include market preference action command, retirement evaluation action command, managing investment action command, market alert action command, and watchlist action command. In some embodiments, each widget 154 is associated with a specific set of action commands 155. For example, referring to FIG. 2, a first widget 154 shown as "widget 1" is associated with two action commands 155 shown as "CTA 1" and "CTA 2." A second widget 154 shown as "widget 2" is associated with one action command 155 shown as "CTA 3." A third widget 154 shown as "widget 3" is associated with three action commands 155 shown as "CTA 4," "CTA 5," and "CTA 6." Note that the first, the second, and the third widgets 154 in FIG. 2 are each illustrated as having two, one, and three action commands 155 respectively for illustrative purposes only. Each widget 154 may be associated with any suitable number and combination of action commands 155 that may be the same or different from each other.

As such, in some embodiments, each persona 153 is associated with a specific set of widgets 154 and each widget 154 is associated with a specific set of action commands 155. Therefore, each persona 153 is associated with a specific set of action commands 155. For example, a first persona 153 may be associated with a first set of action commands 155. A second persona 153 may be associated with a second set of action commands 155. A third persona 153 may be associated with a third set of action commands 155. A fourth persona 153 may be associated with a fourth set of action commands 155. In some embodiments, the action commands 155 included in different sets are mutually exclusive of each other. In other embodiments, the action commands 155 included in different sets are overlapping or at least partially overlapping.

In some embodiments, an action command 155 is associated with a condition 156 and a content item identifier 157. For example, as illustrated in FIG. 2, each action command 155 is uniquely associated with a condition 156 and a content item identifier 157. Conditions 156 are generally used to determine whether to select associated action commands 155 for rendering. Conditions 156 may include conditional statements, conditional expressions, and/or conditional constructs that perform different computations or actions depending on an evaluation of the conditions 156. In some embodiments, condition 156 is configured as a logical statement that is determined to be either true or false. For example, condition 156 may be a Boolean expression to determine whether user 110 has a specific type of user account, such as a retirement account. Each condition 156 of an action command 155 is associated with a content item identifier 157. Content item identifiers 157 include any suitable identifiers associated with content items 142 for rendering with the action commands 155. In some embodiments, in response to determining a condition 156 is true, system 100 may retrieve a content item 142 corresponding to a content item identifier 157 associated with the condition 156.

In some embodiments, memory 152 is further configured to store user accounts 159 associated with users 110. User accounts 159 may include personal and/or financial information associated with users 110. For example, user account 159 may include information indicating that a user 110 is associated with the user account 150 and that a persona 159 is associated with the user 110, and may also include account statistics associated with the user 110.

Portfolio service engine 160 comprises any suitable processing engine configured to manage personas 153, widgets 154, and action commands 155. Portfolio service engine 160 may include tools and libraries to support managing and updating personas 153, widgets 154, and action commands 155. In some embodiments, portfolio service engine 160 is configured to identify a persona 153 associated with a user 100, identify widgets 154 associated with the identified persona 153, and identify action commands 155 associated with the identified persona 153. Portfolio service engine 160 may further send the identified action commands 155 to evaluating engine 161.

Evaluating engine 161 comprises any suitable processing engine configured to evaluate the conditions 156 of action commands 155. Evaluating engine 161 may include tools and libraries to support evaluating a logical statement or a logical expression in conditions 156. In some embodiments, evaluating engine 161 is configured to receive action commands 155 from portfolio service engine 160 and evaluates the conditions 156 associated with the received action commands 155. In some embodiments, evaluating engine 161 evaluates the conditions 156 based on information in a user account 159 associated with user 110. For example, evaluating engine 161 may evaluate a condition 156 that includes an expression to determine whether user 110 has a retirement account. Evaluating engine 161 may inspect an account 159 associated with the user 110 to see whether the user 110 has a retirement account. In some embodiments, upon determining that a condition 156 is evaluated as true, the evaluating engine 161 sends a content item identifier 157 associated with the condition 156 to rendering engine 162.

Rendering engine 162 comprises any suitable engine including any suitable rendering scheme for generating a graphical output. Rendering engine 162 may include tools and libraries to support parsing a markup language (e.g., HTML), analyzing elements in the markup language, and creating a formalized layout of the elements. In some embodiments, rendering engine 162 is configured to receive one or more content item identifiers 157 from evaluating engine 161, and retrieve one or more content items 142 associated with the one or more content item identifiers 157 from content server 140, and render the one or more content items 142 in a graphical user interface. In some embodiments, rendering engine 162 is further configured to render one or more widgets 154 in the graphical user interface. Rendering engine 162 may further send the fully rendered graphical user interface to web browser 122 for displaying it to user 110.

The portfolio service engine 160, the evaluating engine 161, and the rendering engine 162 operate together to dynamically render a graphical user interface. Because different users 110 may have different personas 153, portfolio engine 160 may identify different set of widgets 154 and different set of action commands 155 for different users 110 based on their personas 153. Therefore, the action commands 155 are dynamically determined based on the personas 153 of the users 110. Further, the evaluating engine 161 evaluates the conditions 156 of the action commands 155 based on information in the user accounts 159. The information in the user accounts 159 may change over time. For example, at an earlier time point a user account 159 may indicate that a user 110 does not have a retirement account, but later the user 110 may register a retirement account and the user account 159 accordingly indicates that the user 110 has a retirement account. The change of such information in the user account 159 further affects the evaluation result of condition 156 of certain action commands 155. Continuing with the above example, at the earlier time point a condition 156 including an expression to determine whether the user 110 has a retirement account may be evaluated as false, but later the condition 156 may be evaluated as true. Therefore, the evaluation of the conditions 156 is also a dynamic process, and it further affects the content items 142 that are rendered in the graphical user interface. As a result, the disclosed system may dynamically determine the action commands 155 for a user 110 based on the persona 153 of the user 110, dynamically evaluate the conditions 156 of the action commands for the user 110, and dynamically select content items 142 for rendering based on the evaluation of the conditions 156.

Although portfolio service engine 160, evaluating engine 161, and rendering engine 162 are described as each residing within UI server 150, one of ordinary skill art will appreciate that portfolio service engine 160, evaluating engine 161, and rendering engine 162 may each be a logical component of a same engine, may each be a stand-alone application or device, or may each be an application or device that resides in other components of system 100. In some embodiments, one or more of portfolio service engine 160, evaluating engine 161, and rendering engine 162 are stand-alone applications or devices. In some alternative embodiments, one or more of portfolio service engine 160, evaluating engine 161, and rendering engine 162 reside in other components of system 100. For example, evaluating engine 161 may be embedded in web browsers 122 of user devices 120. As another example, rendering engine 162 may be embedded in web browsers 122 of user devices 120 to provide client-side rendering. Portfolio service engine 160, evaluating engine 161, and rendering engine 162 may be implemented by a same or different processor or set of processors.

System 100 may further comprise any other suitable type and/or number of network devices (not shown). Examples of other network devices include, but are not limited to, web clients, web servers, user devices, mobile phones, computers, tablet computers, laptop computers, software as a service (SaaS) servers, databases, file repositories, file hosting servers, and/or any other suitable type of network device. System 100 may be configured as shown or in any other suitable configuration. Modifications, additions, or omissions may be made to system 100. System 100 may include more, fewer, or other components. Any suitable component of system 100 may include a processor, interface, logic, memory, or other suitable element.

A server described in the present disclosure, such as content server 140 and UI server 150, may include hardware, software, or other server(s). A server may execute any suitable operating system such as, for example, IBM's zSeries/Operating System (z/OS), MS-DOS, PC-DOS, MAC-OS, WINDOWS, a .NET environment, UNIX, OpenVMS, or any other appropriate operating system, including future operating systems. The functions of a server may be performed by any suitable combination of one or more servers or other elements at one or more locations.

An engine described in the present disclosure, such as portfolio service engine 160, evaluating engine 161, and rendering engine 162, may include hardware, software, or other engine(s). An engine may include or execute a special-purpose program that performs a core or essential function for other programs. The functions of an engine may be performed by any suitable combination of one or more engines or other elements at one or more locations.

A processor described in the present disclosure, such as processors 151, may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

A memory described in the present disclosure, such as memory 152, may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

Figure 3:
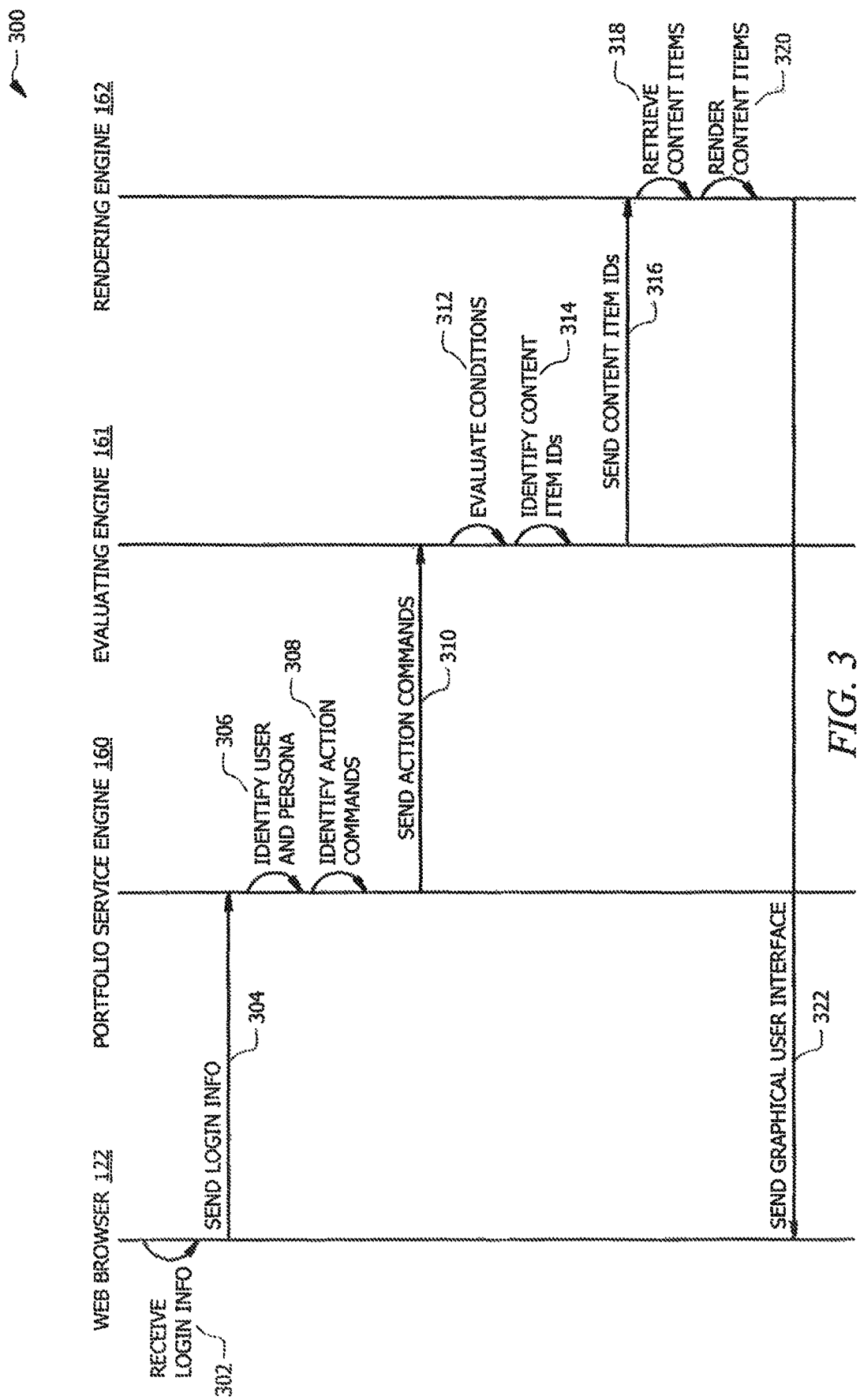
FIG. 3 presents a call graph illustrating an exemplary embodiment of a method of dynamically rendering a graphical user interface, according to the present disclosure.

As noted before, system 100 is operable to personalize and dynamically render a graphical user interface for users 110. The operation of system 100 will be discussed in greater detail below with reference to FIGS. 3-7. FIG. 3 presents a call graph illustrating an exemplary embodiment of a method 300 of dynamically rendering a graphical user interface. FIG. 4-7 illustrate exemplary embodiments of rendered graphical user interfaces for users 110, each associated with different personas 153.

Referring to FIG. 3, In operation, system 100 receives a login information 163 from a user 110. In some embodiments, login information 163 includes a user identifier 164 associated with the user 110. User 110 may operate on a user device 120 and navigate to a web site using web browser 122. For example, user 110-1 may use web browser 122-1 to navigate to a landing page of a web site, and attempt to login to the web site to view his or her account portfolio statistics. In some embodiments, the information rendered by system 100 may relate to a financial portfolio of user 110. However, it should be understood that system 100 may operate to render dynamically any suitable information for a user 110 or set of users 110. The web browser 122 receives the login information 163 from the user 110 (step 302), and forwards it to UI server 150. In some embodiments, web browser 122 forwards the login information 163 to portfolio service engine 160 (step 304).

After receiving the login information 163 from the web browser 122, portfolio service engine 160 identifies a persona 153 associated with the user 110 (step 306). Portfolio service engine 160 may identify the persona 153 associated with the user 110 based on the user identifier 164 and information in the user account 159. In some embodiments, portfolio service engine 160 may identify a user account 159 associated with the user identifier 164, inspect the user account 159, and identify a persona 153 stored in the user account 159. Continuing with the above example, portfolio service engine 160 receives a login information 163 associated with user 110-1, inspects a user account 159 associated with user 110-1, and identifies that user 110-1 is associated with a persona 153 shown as "persona 1" as illustrated in FIG. 2. Then, portfolio service engine 160 identifies the action commands 155 associated with the identified persona 153 (step 308). For example, portfolio service engine 160 may identify the action commands 155 shown as "CTA 1," "CTA 2," "CTA 3," "CTA 4," "CTA 5," "CTA 6" corresponding to the previously identified "persona 1." Portfolio service engine 160 further identifies the widgets 154 associated with the identified persona 153. For example, portfolio service engine 160 may identify widgets 154 shown as "widget 1," "widget 2," "widget 3" corresponding to the previously identified "persona 1." Here, because different users 110 may have different personas 153, portfolio engine 160 may identify different set of widgets 154 and different sets of action commands 155 for different users 110 based on their personas 153. Therefore, the action commands 155 are dynamically determined based on the personas 153 of the users 110. Next, portfolio service engine 160 sends the identified action commands 155 to evaluating engine 161 for evaluating the conditions 156 associated with the identified action commands 155 (step 310).

After receiving the action commands 155, evaluating engine 161 evaluates the conditions 156 associated with the received action commands 155 and determines whether the conditions 156 are met or satisfied (step 312). Evaluating engine 161 may check the logical statement or expression in each of the conditions 156, and determine whether the result is true or false. In some embodiment, evaluating engine 161 evaluates the conditions 156 based on information in the user account 159. For example, evaluating engine 161 may evaluate a condition 156 that includes a logical statement to determine whether a user 110 has a retirement account. Evaluating engine 161 may inspect a user account 159 associated with the user 110 and find that user 110 has a retirement account. Evaluating engine 161 then evaluates the condition 156 as true. Evaluating engine 161 evaluates each of the conditions 156, and identifies the conditions that are met or satisfied. For example, referring to FIG. 2, evaluating engine 161 may evaluate conditions 156 shown as "condition 1," "condition 2," "condition 3," "condition 4," "condition 5," "condition 6" corresponding to previously identified "persona 1", and determine that the conditions 156 shown as "condition 1," "condition 3," "condition 5," and "condition 6" are satisfied. As noted before, the evaluating engine 161 evaluates the conditions 156 of the action commands 155 based on information in the user accounts 159. Note that the information in the user accounts 159 may change over time. And the change of such information in the user account 159 further affects the evaluation result of condition 156 of certain action commands 155. Therefore, the evaluation of the conditions 156 is also a dynamic process, and it further affects the content items 142 that are rendered in the graphical user interface.

After identifying all the conditions 156 that are met or satisfied, evaluating engine 161 identifies content item identifiers 157 associated with the conditions 156 that are met or satisfied (step 314). Evaluating engine 161 then sends the identified content item identifiers 157 to rendering engine 162 for rendering a graphical user interface (step 316).

After receiving the content item identifiers 157 from evaluating engine 161, rendering engine 162 retrieves content items 142 associated with the content item identifiers 157 (step 318). Rendering engine 162 may retrieve the content items 142 from content server 140. Next, rendering engine 162 renders the retrieved content items 142 in a graphical user interface (step 320). For example, rendering engine 162 may retrieve a HTML template for the graphical user interface and render the HTML template with the content items 142. In some embodiments, rendering engine 162 further renders one or more widgets 154 associated with the identified persona 153 in the graphical user interface along with the content items 142. Then, rendering engine 162 sends the rendered graphical user interface to web browser 122 for displaying to user 110 (step 322).

Figure 4:
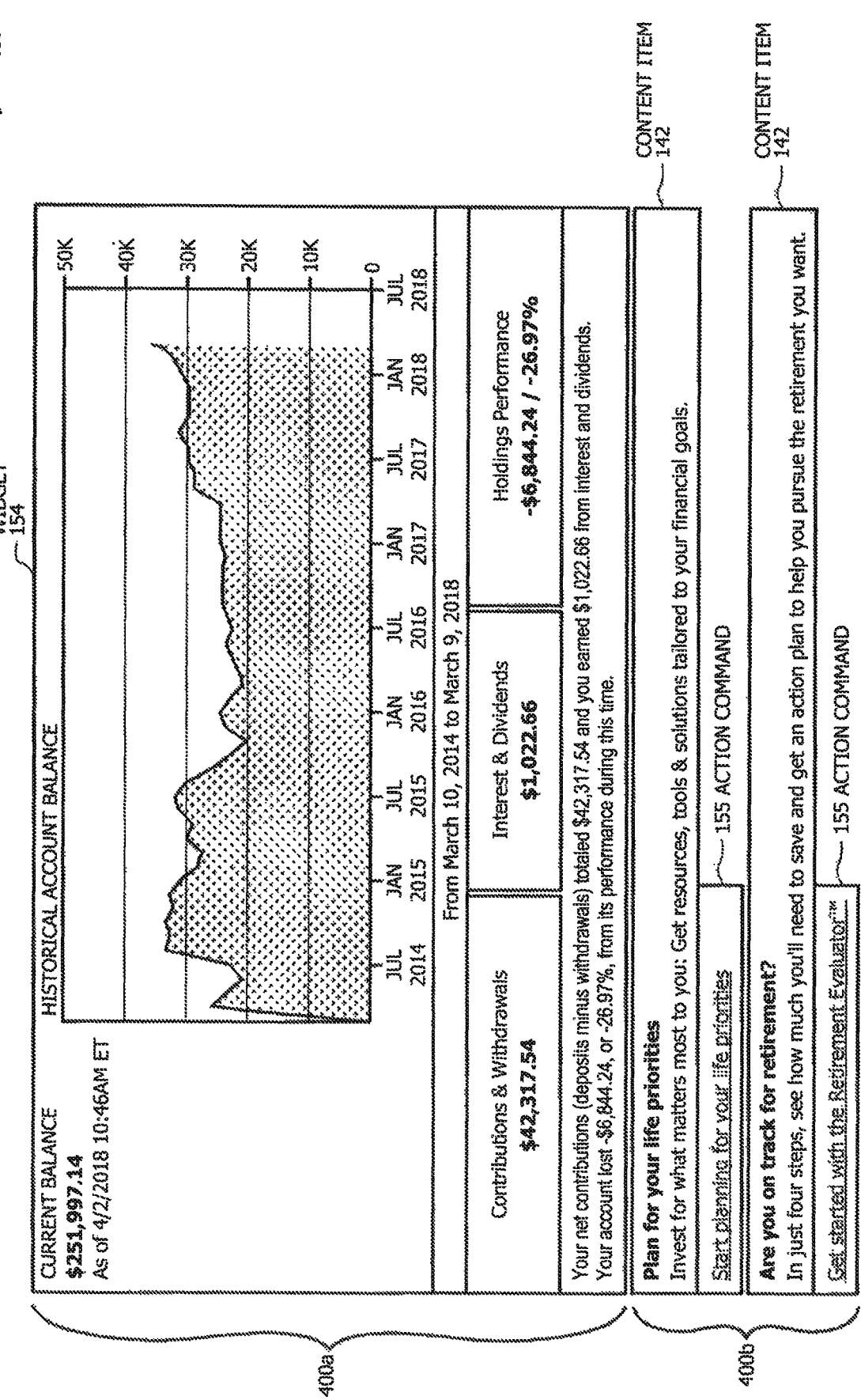
FIG. 4 illustrates an embodiment of a first dynamically rendered graphical user interface, according to the present disclosure.
Figure 5:
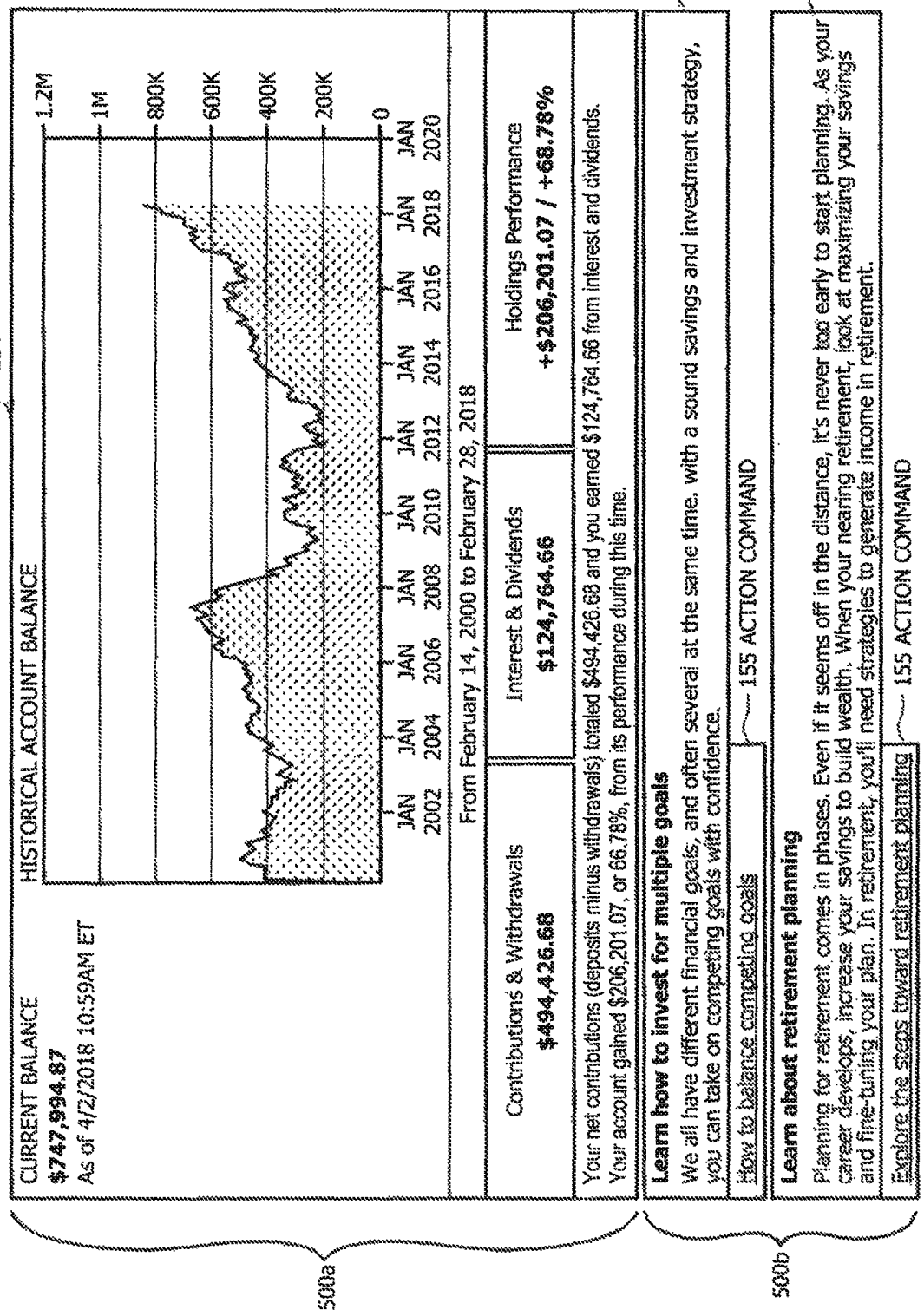
FIG. 5 illustrates an embodiment of a second dynamically rendered graphical user interface, according to the present disclosure.
Figure 6:
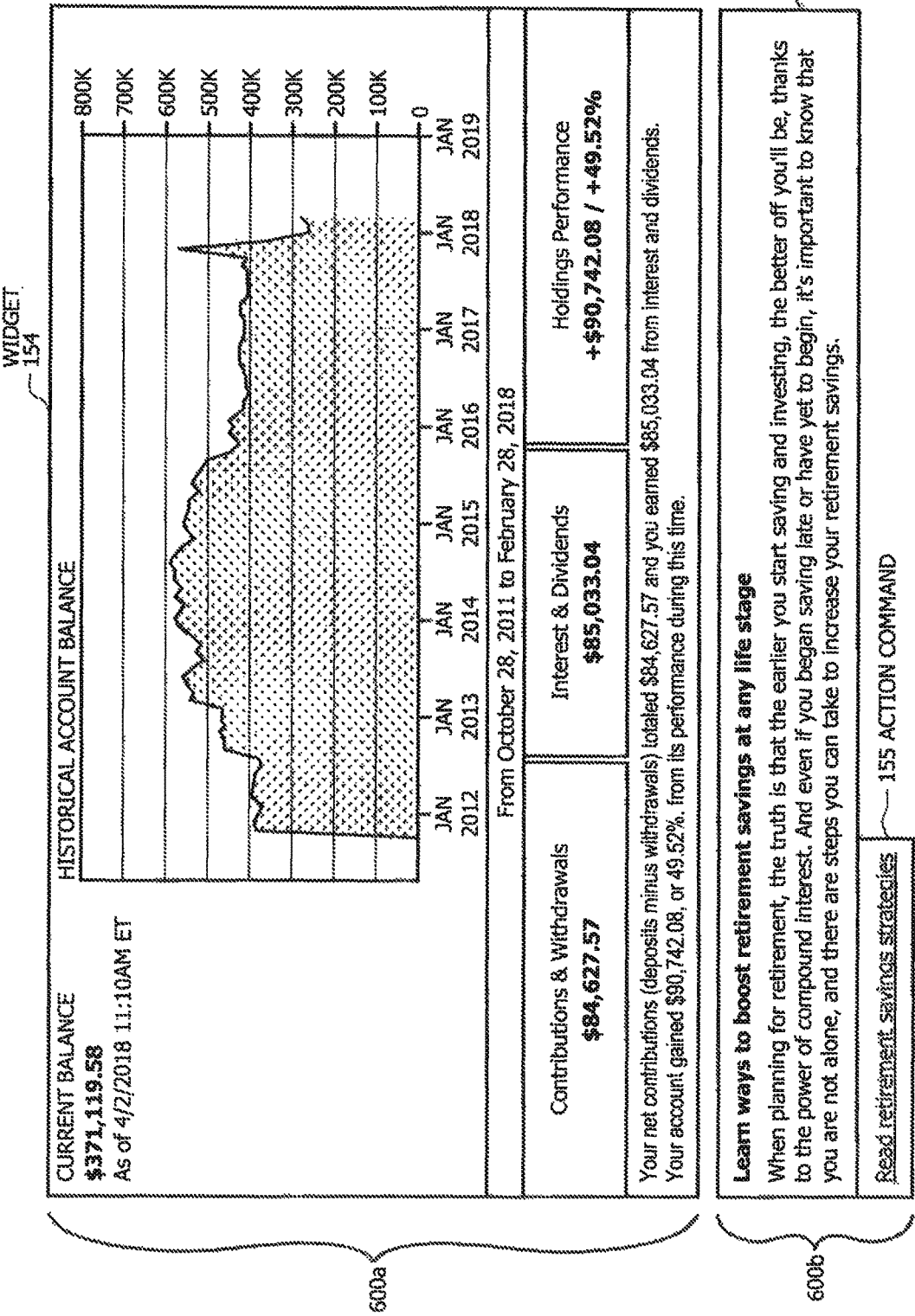
FIG. 6 illustrates an embodiment of a third dynamically rendered graphical user interface, according to the present disclosure.
Figure 7:
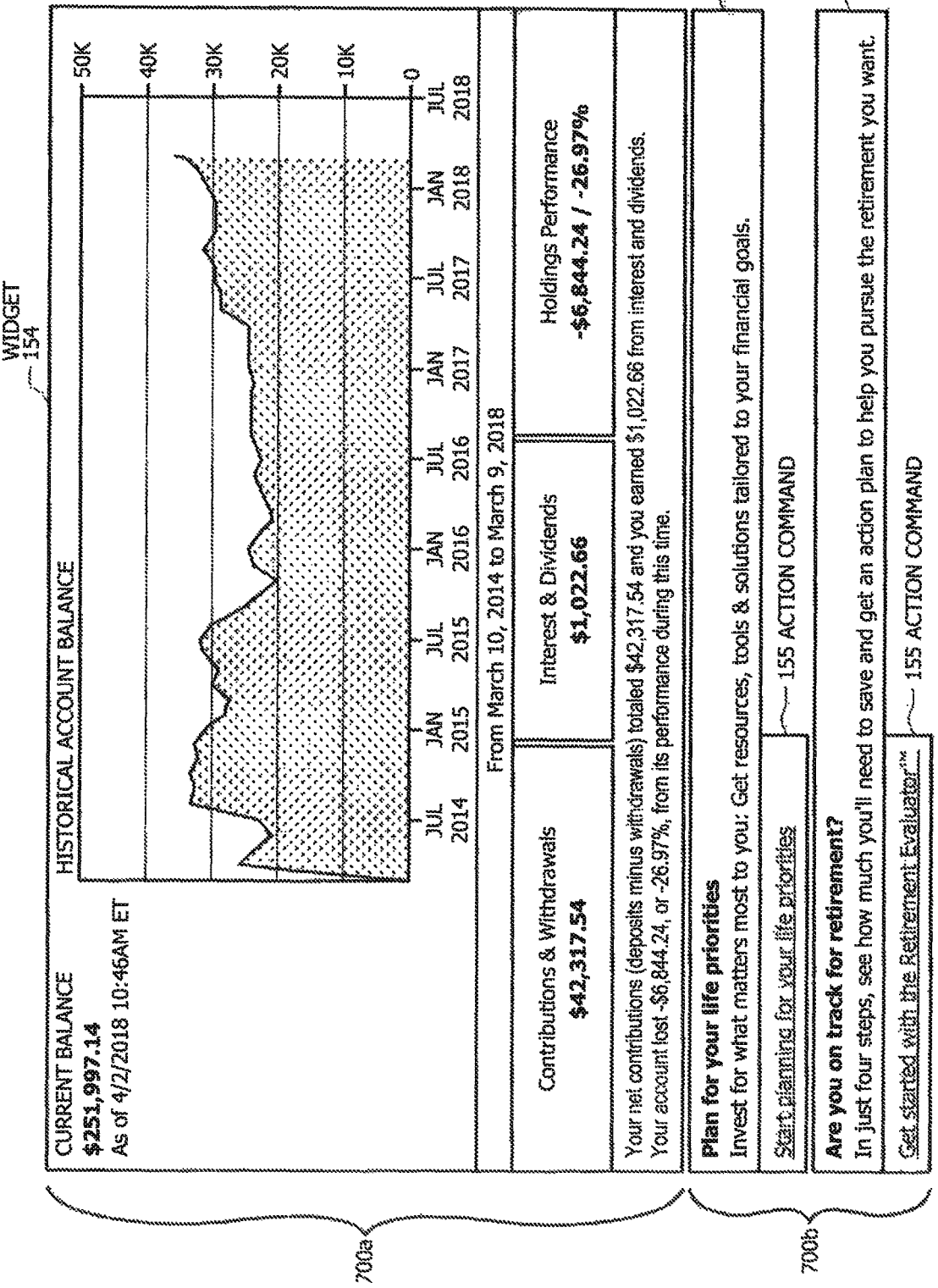
FIG. 7 illustrates an embodiment of a fourth dynamically rendered graphical user interface, according to the present disclosure.

As noted before, the disclosed system 100 is directed to personalizing and dynamically rendering a graphical user interface. For example, the disclosed system 100 may dynamically determine the action commands 155 for a user 110 based on the persona 153 of the user 110, dynamically evaluate the conditions 156 of the action commands for the user 110, and dynamically select content items 142 for rendering based on the evaluation of the conditions 156. As a result, user 110 associated with different personas 153 may be presented with graphical user interfaces configured with different widgets 154 and/or action commands 155 based at least in part on the personas 153. FIGS. 4-7 illustrate exemplary embodiments of dynamically rendered graphical user interfaces for users 110 associated with different personas 153. FIG. 4 illustrates an embodiment of a first dynamically rendered graphical user interface 400 for a first user 110 associated with a first persona 153. FIG. 5 illustrates an embodiment of a second dynamically rendered graphical user interface 500 for a second user 110 associated with a second persona 153. FIG. 6 illustrates an embodiment of a third dynamically rendered graphical user interface 600 for a third user 110 associated with a third persona 153. FIG. 7 illustrates an embodiment of a fourth dynamically rendered graphical user interface 700 for a fourth user 110 associated with a fourth persona 153.

Referring to FIG. 4, graphical user interface 400 is configured with a first section 400a that includes a widget 154 and a second section 400b that includes content items 142 for two action commands 155. As illustrated, section 400a includes a widget 154 that shows "current balance" and "historical account balance" for the first user 110 having a first persona 153 that represents a disengaged client. Section 400b includes content items 142 for a first action command 155 shown as a hyperlink "Start planning for your life priorities" and a second action command 155 shown as a hyper link "Get started with the Retirement Evaluator™".

The first section and the second section of graphical user interface 400 are illustrated as having one widget 154 and two action commands 155 respectively for illustrative purposes only. They may have any suitable number and combination of widgets 154 and action commands 155.

Referring to FIG. 5, graphical user interface 500 is configured with a first section 500a that includes a widget 154 and a second section 500b that includes content items 142 for two action commands 155. As illustrated, section 500a includes a widget 154 that shows "current balance" and "historical account balance" for the second user 110 having a second persona 153 that represents a passive client. Section 500b includes content items 142 for a first action command 155 shown as a hyper link "How to balance competing goals" and a second action command 155 shown as a hyper link "Explore the steps towards retirement planning."

Comparing graphical user interface 500 to graphical user interface 400, both graphical user interfaces include the same widget 154 that shows "current balance" and "historical account balance" for the first and the second users 110 associated with the first and the second personas 153, respectively. As noted before, in some embodiments as illustrated, the widgets 154 associated with different personas 153 may be overlapping. However, in other embodiments, the widgets 154 associated with different personas 153 may be partially overlapping or mutually exclusive of each other. Further, as illustrated, graphical user interface 400 and graphical user interface 500 are configured with action commands 155 exclusive of each other. This is due to the difference in the evaluation results of the conditions 156 associated with action commands 155 for the first and the second users 110. For example, graphical user interface 400 is configured with two action commands 155 shown as "Start planning for your life priorities" and "Get started with the Retirement Evaluator™" associated with conditions 156 that are evaluated as true based on the user account 159 associated with the first user 110. Graphical user interface 500 is configured with another two action commands 155 shown as "How to balance competing goals" and "Explore the steps towards retirement planning" associated with conditions 156 that are evaluated as true based on the user account 159 associated with the second user 110. Based on the evaluation of the conditions 156, the disclosed system 100 is able to dynamically render customized graphical user interfaces for users 110 having different personas 153.

Referring to FIG. 6, graphical user interface 600 is configured with a first section 600a that includes a widget 154 and a second section 600b that includes content items 142 for one action command 155. As illustrated, section 600a includes a widget 154 that shows "current balance" and "historical account balance" for the third user 110 having a third persona 153 that represents an engaged client. Section 600b includes content items 142 for an action command 155 shown as a hyper link "read retirement savings strategies."

Comparing with graphical user interface 400 and graphical user interface 500, graphical user interface 600 is configured with the same widget 154 but different action commands 155 and corresponding content item 142. This is also due to the difference in the evaluation results of the conditions 156 associated with action commands 155 for the first, the second, and the third users 110. For example, graphical user interface 600 is configured with the same widget 154 that shows "current balance" and "historical account balance" as graphical user interfaces 400 and 500. However, graphical user interface 600 is configured with one action command 155 shown as "read retirement savings strategies," which is different from the actions commands 155 included in graphical user interfaces 400 and 500. This is because only the condition 156 associated with the action command 155 shown as "read retirement savings strategies" is evaluated as true based on the user account 159 associated with the third user 110. By doing this, the disclosed system 100 is dynamically rendering graphical user interfaces configured with different action commands 155 for different users 110 having different personas 153.

Referring to FIG. 7, graphical user interface 700 is configured with a first section 700a that includes a widget 154 and a second section 700b that includes content items 142 for two action commands 155. As illustrated, section 700a includes a widget 154 that shows "current balance" and "historical account balance" for the fourth user 110 associated with a fourth persona 153 that represents an active trader. Section 700b includes content items 142 for a first action command 155 shown as a hyper link "Start planning for your life priorities" and a second action command 155 shown as a hyper link "Get started with the Retirement Evaluator™."

Note that graphical user interface 700 and graphical user interface 400 are configured with a same widget 154 and overlapping action commands 155. For example, both graphical user interface 700 and graphical user interface 400 are configured with the same action commands 155 shown as "Start planning for your life priorities" and "Get started with the Retirement Evaluator™". This means that, for both the first and the fourth users 110, the conditions 156 for the two action commands 155 are evaluated as true. However, graphical user interface 700 is configured with the same widget 154 but different action commands 155 as graphical user interfaces 500 and 600. This is because the conditions 156 for the two action commands 155 shown as "Start planning for your life priorities" and "Get started with the Retirement Evaluator™" are evaluated as true for the fourth user 110, but are evaluated as false for the second and the third user 110. By doing this, the disclosed system 100 is dynamically rendering graphical user interfaces configured with the same or different action commands 155 for users 110 based on the dynamic evaluation of the conditions 156 using information in their user account 159.

Note that as shown in FIGS. 4-7, graphical user interface 400, 500, 600, and 700 are configured to include a same widget 154 for illustrative purposes only. They may include any suitable number and combination of widgets 154 that may be the same or different from each other.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for dynamically rendering a graphical user interface, comprising:
   a content server, the content server configured to store a plurality of content items for rendering a graphical user interface;
   a user interface server, the user interface server comprising:
      a memory configured to store:
         a first persona represented by a first fictional character and associated with a first set of users sharing a first set of common characteristics, wherein the first persona is further associated with a first widget and a second widget; and
         a second persona represented by a second fictional character and associated with a second set of users sharing a second set of common characteristics, wherein the second persona is further associated with the first widget and a third widget;
      wherein:
         the second widget and the third widget are mutually exclusive of each other;
         the first widget is associated with at least:
            a first action command that provokes a first response from a user and comprises a first condition and a first content item identifier associated with the first condition, the first content item identifier being associated with a corresponding content item stored in the content server; and
            a second action command that provokes a second response from a user and comprises a second condition and a second content item identifier associated with the second condition, the second content item identifier being associated with a corresponding content item stored in the content server:
         the second widget is associated with at least a third action command that provokes a third response from a user and comprises a third condition and a third content item identifier associated with the third condition, the third content item identifier being associated with a corresponding content item stored in the content server; and
         the third widget is associated with at least a fourth action command that provokes a fourth response from a user and comprises a fourth condition and a fourth content item identifier associated with the fourth condition, the fourth content item identifier being associated with a corresponding content item stored in the content server;
      a portfolio service engine, communicatively coupled to the memory and configured to:
         receive login information associated with a first user;
         associate the first user with the second persona based on the received login information;

identify the first widget and the third widget associated with the second persona;
identify a subset of the action commands associated with the second persona, including at least the first action command, second action command, and fourth action command; and
send the identified subset of the action commands to an evaluating engine;
the evaluating engine communicatively coupled to the portfolio service engine and configured to:
receive the identified subset of the action commands from the portfolio service engine;
evaluate the conditions associated with the identified subset of the action commands based at least in part on account information associated with the first user;
determine one or more of the conditions associated with the retrieved subset of the action commands that are satisfied based on the evaluating;
identify one or more content item identifiers associated with the determined one or more of the conditions; and
send the identified one or more content item identifiers to a rendering engine; and
the rendering engine communicatively coupled to the evaluating engine and configured to:
receive the identified one or more content item identifiers from the evaluating engine;
retrieve one or more content items associated with the identified one or more content item identifiers from the content server; and
render the retrieved one or more content items in a graphical user interface.

2. The system of claim 1, wherein the login information associated with the first user comprises a first user identifier associated with the first user.

3. The system of claim 2, wherein associating the first user with the second persona comprises:
identifying a user account associated with the first user identifier; and
identifying the second persona stored in the identified user account.

4. The system of claim 3, wherein evaluating the conditions associated with the identified subset of the action commands comprises evaluating the conditions associated with the identified subset of the action commands based on the identified user account.

5. The system of claim 4, wherein the identified user account comprises at least one of the following:
a retirement account;
an investment account; or
a saving account.

6. A non-transitory computer-readable medium comprising logic for dynamically rendering a graphical user interface, the logic, when executed by a processor, operable to:
store in a memory:
a first persona represented by a first fictional character and associated with a first set of users sharing a first set of common characteristics, wherein the first persona is further associated with a first widget and a second widget;
a second persona represented by a second fictional character and associated with a second set of users sharing a second set of common characteristics, wherein the second persona is further associated with the first widget and a third widget;
wherein:
the second widget and the third widget are mutually exclusive of each other;
the first widget is associated with at least:
a first action command that provokes a first response from a user and comprises a first condition and a first content item identifier associated with the first condition, the first content item identifier being associated with a corresponding content item stored in the content server; and
a second action command that provokes a second response from a user and comprises a second condition and a second content item identifier associated with the second condition, the second content item identifier being associated with a corresponding content item stored in the content server;
the second widget is associated with at least a third action command that provokes a third response from a user and comprises a third condition and a third content item identifier associated with the third condition, the third content item identifier being associated with a corresponding content item stored in the content server; and
the third widget is associated with at least a fourth action command that provokes a fourth response from a user and comprises a fourth condition and a fourth content item identifier associated with the fourth condition, the fourth content item identifier being associated with a corresponding content item stored in the content server;
receive a login information associated with a first user;
associate the first user with the second persona based on the received login information;
identify the first widget and the third widget associated with the second persona;
identify a subset of the action commands associated with the second persona, including at least the first action command, second action command, and fourth action command;
evaluate the conditions associated with the identified subset of the action commands based at least in part on account information associated with the first user;
determine one or more of the conditions associated with the identified set of the action commands that are satisfied based on the evaluating;
identify one or more content item identifiers associated with the determined one or more of the conditions;
retrieve one or more content items associated with the identified one or more content item identifiers; and
render the retrieved one or more content items in a graphical user interface.

7. The non-transitory computer-readable medium of claim 6, wherein the login information associated with the first user comprises a first user identifier associated with the first user.

8. The non-transitory computer-readable medium of claim 7, wherein associating the first user with the second persona comprises:
identifying a user account associated with the first user identifier; and
identifying the second persona stored in the identified user account.

9. The non-transitory computer-readable medium of claim 8, wherein evaluating the conditions associated with the identified subset of the action commands comprises evaluating the conditions associated with the identified subset of the action commands based on the identified user account.

10. The non-transitory computer-readable medium of claim 9, wherein the identified user account comprises at least one of the following:
   a retirement account;
   an investment account; or
   a saving account.

11. A method for dynamically rendering a graphical user interface, comprising:
   storing in a memory:
      a first persona represented by a first fictional character and associated with a first set of users sharing a first set of common characteristics, wherein the first persona is further associated with a first widget and a second widget;
      a second persona represented by a second fictional character and associated with a second set of users sharing a second set of common characteristics, wherein the second persona is further associated with the first widget and a third widget;
   wherein:
      the second widget and the third widget are mutually exclusive of each other;
      the first widget is associated with at least:
         a first action command that provokes a first response from a user and comprises a first condition and a first content item identifier associated with the first condition, the first content item identifier being associated with a corresponding content item stored in the content server; and
         a second action command that provokes a second response from a user and comprises a second condition and a second content item identifier associated with the second condition, the second content item identifier being associated with a corresponding content item stored in the content server;
      the second widget is associated with at least a third action command that provokes a third response from a user and comprises a third condition and a third content item identifier associated with the third condition, the third content item identifier being associated with a corresponding content item stored in the content server; and
      the third widget is associated with at least a fourth action command that provokes a fourth response from a user and comprises a fourth condition and a fourth content item identifier associated with the fourth condition, the fourth content item identifier being associated with a corresponding content item stored in the content server;
   receiving a login information associated with a first user;
   associating the first user with the second persona based on the received login information;
   identifying the first widget and the third widget associated with the second persona;
   identifying a subset of the action commands associated with the second persona, including at least the first action command, second action command, and fourth action command:
   evaluating the conditions associated with the identified subset of the action commands, based at least in part upon account information associated with the first user;
   determining one or more of the conditions associated with the identified set of the action commands that are satisfied based on the evaluating;
   identifying one or more content item identifiers associated with the determined one or more of the conditions;
   retrieving one or more content items associated with the identified one or more content item identifiers; and
   rendering the retrieved one or more content items in a graphical user interface.

12. The method of claim 11, wherein the login information associated with the first user comprises a first user identifier associated with the first user.

13. The method of claim 12, wherein associating the first user with the second persona comprises:
   identifying a user account associated with the first user identifier; and
   identifying the second persona stored in the identified user account.

14. The method of claim 13, wherein evaluating the conditions associated with the identified subset of the action commands comprises evaluating the conditions associated with the identified subset of the action commands based on the identified user account.

* * * * *